(12) United States Patent
Kamiya et al.

(10) Patent No.: US 6,419,764 B1
(45) Date of Patent: Jul. 16, 2002

(54) HYDROGEN STORAGE MATERIAL (75) Inventors: Yoshihisa Kamiya; Kunio Takahashi; Makoto Tsukahara, all of Aichi-ken (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 0 days.

(21) Appl. No.: 09/598,977

(22) Filed: Jun. 21, 2000

(30) Foreign Application Priority Data

Jun. 21, 1999 (JP) .......................................... 11-174385

(51) Int. Cl.[7] .............................................. C22C 27/02
(52) U.S. Cl. ...................... 148/422; 420/424; 420/900; 148/538
(58) Field of Search ................................. 148/422, 421, 148/538; 420/900, 424

(56) References Cited

U.S. PATENT DOCUMENTS

| | | | | |
|---|---|---|---|---|
| RE34,588 E | * | 4/1994 | Hong | ........................... 423/644 |
| 5,738,736 A | * | 4/1998 | Tsuji et al. | ................... 148/421 |
| 6,153,032 A | * | 11/2000 | Iba et al. | ..................... 148/669 |
| 6,270,719 B1 | * | 8/2001 | Fetcenko et al. | ............ 420/588 |

FOREIGN PATENT DOCUMENTS

| | | | |
|---|---|---|---|
| JP | 7-252560 | | 10/1995 |
| JP | 09053135 A | * | 2/1997 |
| JP | 09053136 A | * | 2/1997 |
| JP | 09087781 A | * | 3/1997 |
| JP | 10-110225 | | 4/1998 |
| JP | 11106859 A | * | 4/1999 |

* cited by examiner

*Primary Examiner*—Roy King
*Assistant Examiner*—Harry D. Wilkins, III
(74) *Attorney, Agent, or Firm*—Oblon, Spivak, McClelland, Maier & Neustadt, P.C.

(57) ABSTRACT

A hydrogen storage material includes a vanadium-based body-centered cubic matrix phase containing at least titanium and nickel in solid solution in the matrix phase. There is a positive correlation between the titanium concentration distribution in the matrix phase and the nickel concentration distribution in the matrix phase. The hydrogen storage material has a high activation characteristic and can be produced without heat-treatment at low cost. The material has the ground formula $V_{160-x-y-z}Ti_xCr_yNi_z$, where $5 \leq x \leq 15$, $5 \leq y \leq 25$, $0 < z < (\frac{1}{2})x$ and $z < 5$.

17 Claims, 7 Drawing Sheets

HYDROGEN STORAGE MATERIAL

BACKGROUND OF THE INVENTION

1. Field of the Invention

The present invention generally relates to a hydrogen storage material. More particularly, the present invention relates to a hydrogen storage material having a novel composition.

2. Discussion of the Background

In discussion that follows, metallic alloy compositions are expressed using atomic ratios, while hydrogen concentrations in the alloys are expressed in weight percent (wt %").

Various hydrogen storage materials are known, such as, for example, $AB_5$ alloys (e.g. $LaNi_5$), $AB_2$ alloys (e.g. $ZrMn_2$), AB alloys (e.g. TiFe), $A_2B$ alloys (e.g. $Mg_2Ni$) and Ti—V-based alloys. These alloys are classified as solid solution alloys.

Ti—V-based alloys can absorb sufficient hydrogen to form dihydrides. At room temperature and atmospheric pressure, Ti—V-based alloys containing dihydrides can also discharge hydrogen to form monohydrides. In contrast, $AB_5$ alloys (e.g. $LaNi_5$) can only absorb sufficient hydrogen to form monohydrides. Compared with the other hydrogen storage materials, Ti—V-based alloys exhibit high rechargeability. As a result, Ti—V-based alloys are expected to find practical use as hydrogen storage materials.

Practical hydrogen storage materials are required to exhibit high rechargeability, high activation performance and pressure-composition isotherms (PCT curves) with flat plateau regions.

Ti—V hydrogen storage materials need high temperature and high hydrogen pressure for activation. In addition, as a result of spatial fluctuations in Ti concentration, Ti—V hydrogen storage materials typically show little flatness in the plateau region on their PCT curves. Typical Ti—V hydrogen storage materials must have higher hydrogen rechargeability for practical use. Ti—V-based alloys containing elements such as chromium (Cr) or manganese (Mn), which have atomic diameters <95% of that of vanadium, can be activated at lower temperature than materials not containing such smaller elements. A homogenization by heat treatment is effective to improve the flatness of the plateau region.

Ti—V-based alloys form vanadium-based solid solutions in broad composition ranges. During the alloying process, a concentration gradient of Ti appears along the solidification direction. This causes the plateaus on the PCT curves to show little flatness, because the dissociation pressure of Ti—V-based alloys decreases with increasing Ti concentration. To improve the flatness of the plateaus on the PCT curves, homogenization by heat treatment is effective.

Japanese Laid-open Publication No. 10-110225 discloses V—Ti—Cr alloys with a microstructure attributed by spinodal decomposition in body-centered cubic (BCC) phase of ternary alloys. This reference shows a method of controlling the rechargeability of hydrogen by controlling of alloy microstructure. Practically, the disclosed microstructure decreases the activation temperature of the alloy and increases hydrogen discharge capacity.

Japanese Laid-open Publication No. 7-252560 discloses $Ti_{100-x-y-z}Cr_xA_yB_z$. In this formula, "A" is at least one element is selected from V, Nb, Mo, Ta and W; and "B" is at least two elements are selected from Zr, Mn, Fe, Co, Ni and Cu. The alloy is composed of at least five elements and has a BCC structure. The flatness of the plateau region is improved by controlling the amount of element "B" to within the range of 0<z<20. By controlling the amount of B, the dissociation pressure of the hydrogen storage material can also be controlled.

However, these known hydrogen storage materials have little flatness in the plateau regions of the PCT curves and little rechargeability capacity. In order to improve the flatness and capacity, homogenization by heat treatment is conducted. However, Ti—V- based alloys are easily oxidized during heat treatment, even in vacuum, which decreases hydrogen discharge capacity.

SUMMARY OF THE INVENTION

The present invention provides a hydrogen storage material that includes at least titanium and nickel in a matrix phase having a body-centered cubic crystal structure. The concentration of the titanium and the nickel in the matrix phase exhibit a positive correlation. The hydrogen storage material according to the present invention can be easily activated at low cost, because the material exhibits flat plateau regions in its PCT curves without homogenization.

BRIEF DESCRIPTION OF THE DRAWING

Additional features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENTS

The inventors have been researching V—Ti—Cr hydrogen storage alloys and find a certain material that has a good flatness of the plateau region on its pressure-composition isotherms and a good activation performance by containing particular amount of nickel (Ni) against titanium (Ti) as constituents.

The particular formula of the hydrogen storage material of the present invention is defined as $V_{100-x-y-z}Ti_xCr_yNi_z$ where $5 \leq x \leq 15$, $5 \leq y \leq 25$, $0 < z < (\frac{1}{2})$ x, and $z < 5$.

In order to obtain a flat plateau region, nickel (Ni) is contained in the material. The amount of the nickel is selected in the range of $0 < z < (\frac{1}{2})$ x, and $z < 5.0$.

The stability of hydrides of Ti—V-based alloys strongly depends on the concentration of Ti and Ni. The dissociation pressure of the hydrides is increased with increasing Ni concentration and with decreasing Ti concentration. In the alloy of the present invention, a concentration gradient of Ti and Ni appears along the solidification direction during the alloying process, and the concentrations of Ti and Ni in the matrix phase are positively correlated. As a result, although the alloy composition is not homogenized, flat plateau regions in the PCTs are obtained.

A concentration of Ni (z) has an effective range against a concentration of Ti (x). The range is 0<z<(½) x. At higher than 5 atomic % Ni, one or more phases such as a TiNi phase, $Ti_2Ni$ phase, Ni—V σ-phase or Ti—V—Mn—Ni Laves phase are precipitated, which decreases the hydrogen discharge capacity. The preferable range of z (Ni concentration) is z<5.

The dissociation pressure decreases with increasing Ti concentration. If the concentration of Ti is lower than 5 atomic % (not including 5 atomic %), a chemical reaction between hydrogen and alloy is deficient and the alloy does not show sufficient hydrogen storage capacity. In this range, the dissociation pressure is higher than that for practical use. In order to decrease the dissociation pressure, it is necessary to decrease the concentration of Cr. However, if the concentration of Cr is lower than 5 atomic %, the alloy is not activated at a practical temperature.

With increasing Ti concentration, flatness of the plateau region is decreased. If the x exceeds 15, flatness of the plateau region will be significantly worse.

Dissociation pressure is increased with increasing Cr concentration. If the concentration of Cr is lower than 5 atomic % (not including 5 atomic %), high temperature is required to be activated, and the alloy is not activated at a practical temperature.

If dissociation pressure is adjusted for a practical use, y (Cr concentration) should be lower than 25 atomic % for the alloys containing 15 atomic % Ti. If the Cr concentration exceeds 25 atomic %, the dissociation pressure is too high for practical use.

Therefore, the values of x and y are determined in order to show appropriate stability under conditions of pressure and temperature where the hydrogen storage material is used.

Adding manganese (Mn) to the alloy improves the reaction rate for hydrogen and hydrogen storage capacity up to 5 atomic % Mn. If the Mn concentration exceeds 5 atomic %, the hydrogen discharge capacity is decreased. Therefore the amount of addition of Mn should be determined less than 5 atomic % (including 5 atomic %).

EXAMPLES

First Embodiment

A hydrogen storage material according to a first embodiment of the present invention contains vanadium, titanium, chromium and nickel, which are regularly sold in the market. The composition of an alloy in this embodiment can be represented by the following formula:

$V_{69}Ti_{10}Cr_{20}Ni_1$

The first embodiment is alloyed under argon atmosphere using arc melting method. The first embodiment is cooled down between $10^2$ and $10^4$ degrees Celsius per second to obtain 10 grams of ingot material.

The alloy ingot is crushed into grains in 5–10 mm using a mortar which is made from stainless steel. The gains are put into a reaction cylinder, which is subsequently evacuated. The reaction cylinder is heated to 400 degrees Celsius and 3.0 MPa hydrogen is introduced into the cylinder and kept 5 minutes. Subsequently it is cooled down to the room temperature to hydrogenate the grains.

The hydrogenated grains are mechanically crushed into particles about 100 μm in diameter using the mortar in air.

In order to measure activation temperature, the powder sample is put in a reactor, which is subsequently evacuated. The reactor is gradually heated up and the temperature at which the sample starts to dissociate hydrogen is measured with Sieverts' type apparatus. This temperature is defined as an activation temperature.

The PCT curves for the alloy are evaluated in accordance with JIS (Japan Industrial Standard)- H-7201.

Comparative Example 1 contains vanadium, titanium and chromium that are sold in the market. The composition of the alloy of Comparative Example 1 is represented by the following formula:

$V_{70}Ti_{10}Cr_{20}$

Comparative Example 1 does not contain nickel. The Comparative Example 1 hydrogen storage material is prepared using the process referred to in the first embodiment. The PCT curves for the first comparative example are evaluated in the same way as the first embodiment.

Comparative Example 2 contains vanadium, titanium, chromium and nickel that are sold in the market. The composition of the alloy of Comparative Example 2 is represented by the following formula:

$V_{65}Ti_{10}Cr_{20}Ni_5$

From this material, the Comparative Example 2 hydrogen storage material is prepared using the same process as in the first embodiment. The PCT curves for Comparative Example 2 are evaluated in the same way as the first embodiment.

Figure 1:
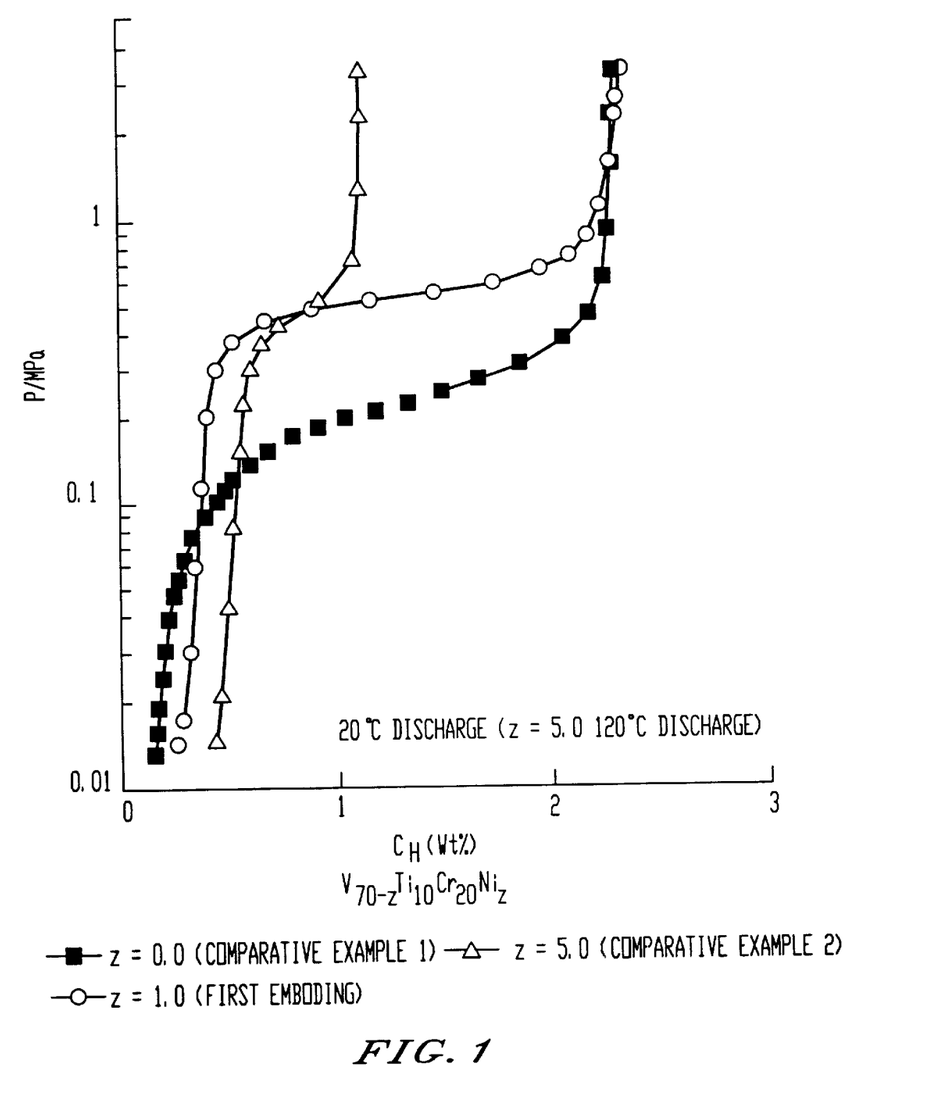
FIG. 1 shows pressure-composition isotherms.

FIG. 1 shows PCT curves for the first embodiment and for Comparative Examples 1 and 2. The horizontal axis shows hydrogen concentration $C_H$ (wt %). The vertical axis shows hydrogen pressure P (MPa) where the hydrogen storage material is placed. The PCT curves of discharge for the first embodiment and Comparative Example 1 are evaluated at 20° C. The PCT curve for Comparative Example 2 is evaluated at 0° C. with discharging. The origin point is determined as the point where the samples were evacuated at 60° C. for 3 hours.

Although the hydrogen discharge capacity of the first embodiment is a little smaller than that of Comparative Example 1, the flatness of the plateau region is improved. Further, the first embodiment has a flatter plateau region and a larger capacity of hydrogen than Comparative Example 2.

In this regard, the flatness of the plateau region could be obtained without homogenization by heat treatment. The flatness of the plateau region and hydrogen discharge capacity of the alloys containing >5 atomic % Ni is worse than that of the alloys containing <5 atomic % Ni. To obtain good performance the concentration of nickel should be less than 5 atomic %. The alloys with the above mentioned composition show good performance without homogenization by heat treatment. This leads to a reduction in production costs.

The activation temperature of Comparative Example 1 is 200° C. However, the activation temperatures of the first embodiment and of Comparative Example 2 are 150° C. Thus, it is clear that the activation characteristic is improved by adding nickel to the alloys.

Second Embodiment

A hydrogen storage material according to a second embodiment of the present invention contains vanadium, titanium, chromium, nickel and manganese, which are regularly sold in the market. The composition of an alloy in this embodiment is represented by the following formula:

$V_{68}Ti_{10}Cr_{20}Ni_{1.0}Mn_{1.0}$

The second embodiment is prepared using the same process as the first embodiment. The second embodiment is also evaluated in the same way of the first embodiment.

The activation temperature of the second embodiment is 120° C., which is lower that the activation temperature of the first embodiment. The activation temperature of the material decreases with increasing Mn concentration in the alloy of the first embodiment.

Figure 2:
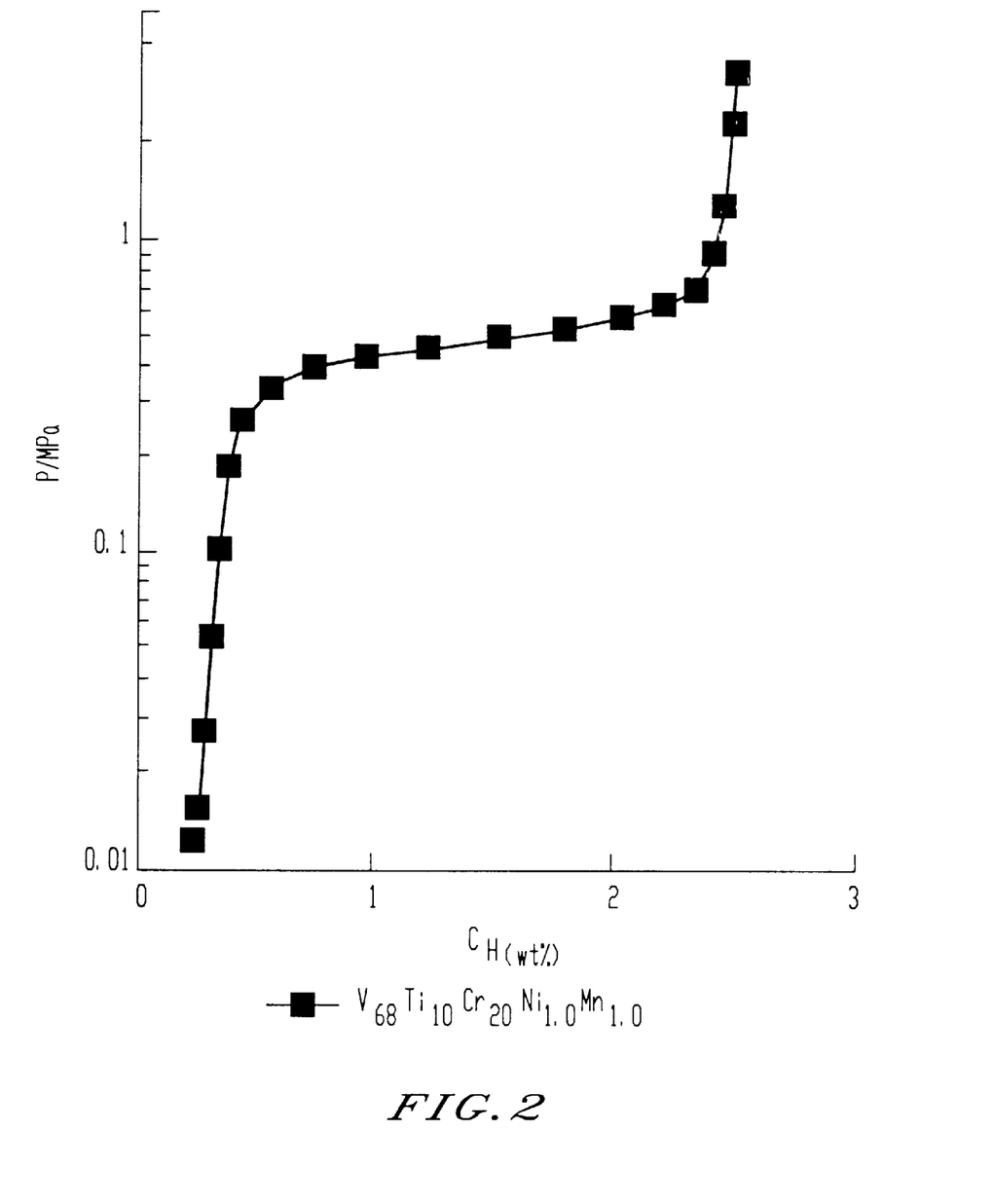
FIG. 2 shows a pressure-composition isotherm.

FIG. 2 shows a PCT curve for the second embodiment at 20° C. The horizontal axis shows hydrogen concentration $C_H$ (wt %). The vertical axis shows hydrogen pressure P (MPa) in the atmosphere where the hydrogen storage material is placed.

The discharge capacity of the second embodiment is improved comparing to the first embodiment. The discharge capacity of hydrogen is increased by the addition of manganese for V—Ti—Cr alloys. Therefore, the addition of manganese to the alloys compensates for decrease of discharge capacity attributed to the addition of Ni.

The metallurgical evaluation on a polished cross-section of the second embodiment is conducted with a scanning electron microscope with EDX (Energy dispersive X-ray spectroscopy) or WDX (wavelength dispersive X-ray spectroscopy).

Figure 3:
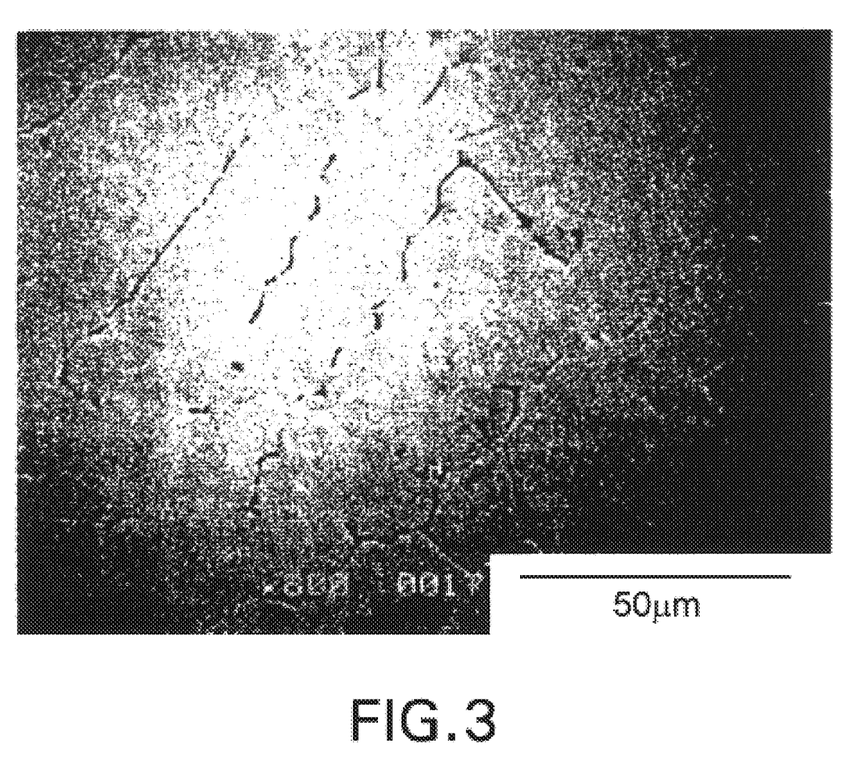
FIG. 3 shows a sectional view obtained using a scanning electron microscope of a $V_{68}Ti_{10}Cr_{20}Ni_{1.0}Mn_{1.0}$ alloy.

FIG. 3 shows a sectional view of the second embodiment using a scanning electron microscope. The black portion is grain boundary and the other portion is a matrix of a BCC phase. An average composition of the matrix is analyzed using EDX with ZAF compensation and the obtained formula is $V_{71.1}Ti_{6.9}Cr_{20.6}Mn_{0.6}Ni_{0.6}$. Ti, Ni and Mn are concentrated in the grain boundary phase as compared to the matrix.

Figure 4:
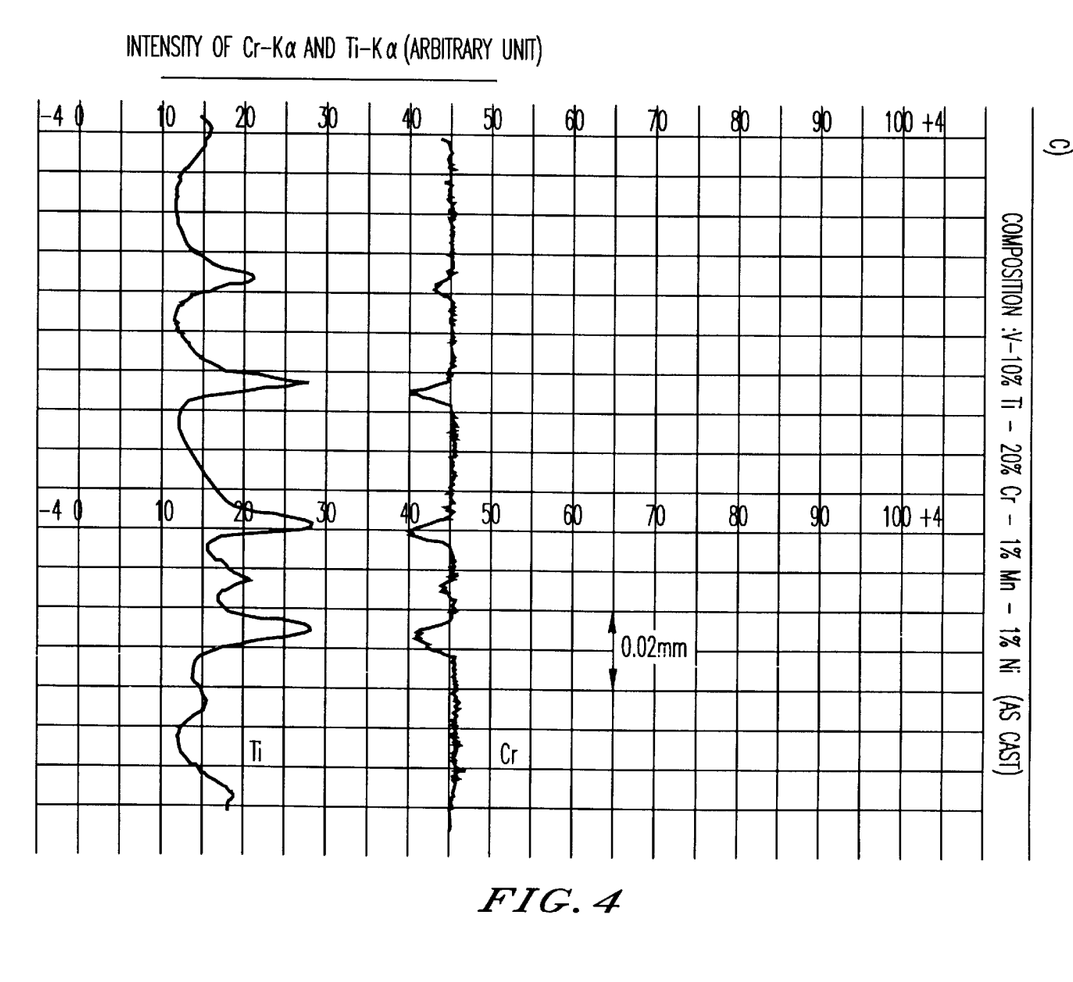
FIG. 4 shows the distribution of Ti and Cr in an alloy using a line scan with Ti—$K\alpha$ and Cr—$K\alpha$ radiation.

Concentrations of Ti, Cr and Ni are analyzed using a WDX line scan on the polished cross section. FIG. 4 shows results of Ti and Cr for the second embodiment using the line scan of Ti—Kα radiation and Cr—Kα radiation. The horizontal axis shows a distance of the section of the hydrogen storage material and the vertical axis shows an intensity of Ti—Kα and Cr—Kα.

The peak of Ti—Kα radiation corresponds to a grain boundary phase. The concentration of Cr ain the grain boundary phase is relatively low compared to the matrix. The fluctuation in Ti concentration in the matrix is about 1.5 atomic % while that of Cr is lower than that of Ti.

Figure 5:
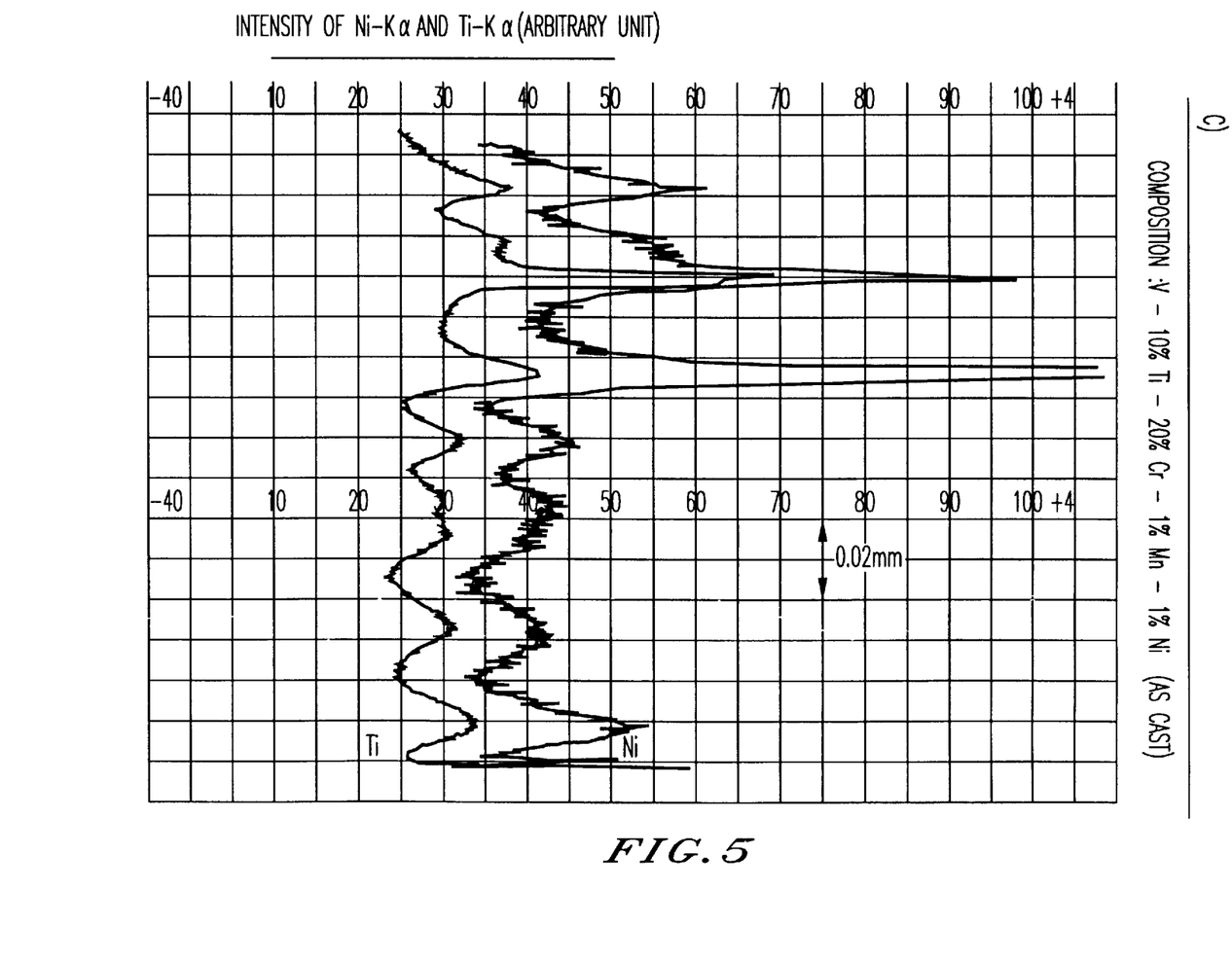
FIG. 5 shows the distribution of Ti and Ni in an alloy using a line scan with Ti—$K\alpha$ and Ni—$K\alpha$ radiation.

FIG. 5 shows results of Ti and Ni of the second embodiment using a line scan of Ti—Kα radiation and Ni—Kα radiation. The horizontal axis shows a distance of the section of the hydrogen storage material and the vertical axis shows the intensity of Ti—Kα radiation and Ni—Kα radiation. The Ni concentration distribution has a positive correlation with that of Ti in the matrix phase. The fluctuation of Ni concentration in the matrix is about 0.3 atomic % and there exists a grain boundary phase where Ni is relatively concentrated.

Based on the above analysis, the hydrogen storage material according to this invention shows a superior flatness in the plateau region of PCT curves as a result of using a Ni concentration distribution in the matrix phase which has a positive correlation with a Ti concentration distribution. Although the hydrogen storage material is not homogenized, the material shows a homogenized stability for dehydrogenation. Easy activation is attributed to the relatively dense concentration of Ni, which works as a catalyst, at the grain boundary. The Comparative Example 2 with z=5 also has a Ni concentration distribution that has positive correlation with the Ti concentration distribution. However, the fluctuation in the Ni concentration in the matrix phase is about 1 atomic % and that of Ti is about 1.5 atomic %. The fluctuation in the Ni concentration is too large in comparison with that of the Ti for the alloy to show a good flatness of the plateau region.

Third Embodiment

To clarify the correlation between concentration of Ti and Ni and the flatness of the plateau region, the present invention is compared with comparative examples. It is preferable that Ni concentration distribution is within a certain range relative to the Ti concentration distribution.

The hydrogen storage material according to this third embodiment of the present invention contains vanadium, titanium, chromium and nickel, which are regularly sold in the market. The composition of an alloy in this embodiment is represented by the following formula:

$$V_{87.5-x-y-z}Ti_xCr_{12.5}Ni_z x=5,10,15$$

The value z is determined so that z/x=0, 0.05, 0.1, 0.2, 0.3, 0.4, 0.5, 0.6. This embodiment is prepared using the same process referred to in the first embodiment. This embodiment is also evaluated in the same way as the first embodiment.

Figure 6:
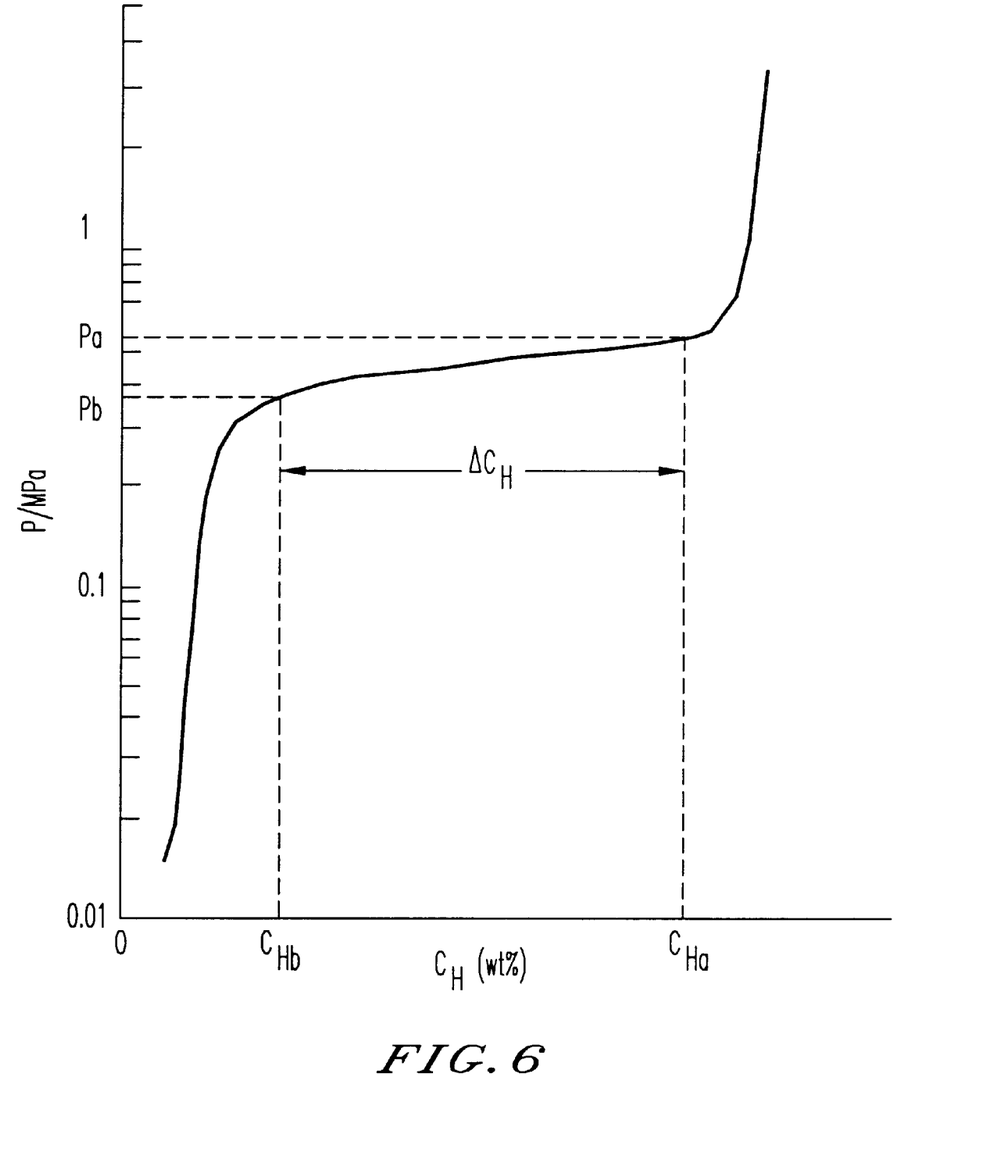
FIG. 6 shows a typical pressure-composition isotherm for a metal-hydrogen system.

FIG. 6 shows a typical PCT curve for this alloy. The horizontal axis shows hydrogen concentration $C_H$ (wt %) in the alloy. The vertical axis shows hydrogen pressure P (MPa) in the atmosphere where the hydrogen storage material is placed. $P_a$ is arbitrary hydrogen pressure and $P_b=e^-$ 0.4Pa. $C_{Ha}$ and $C_{Hb}$ are defined as the hydrogen composition in a hydrogen storage material at Pa and Pb, respectively. $\Delta C_H$ is defined as $C_{Ha}-C_{Hb}$.

Figure 7:
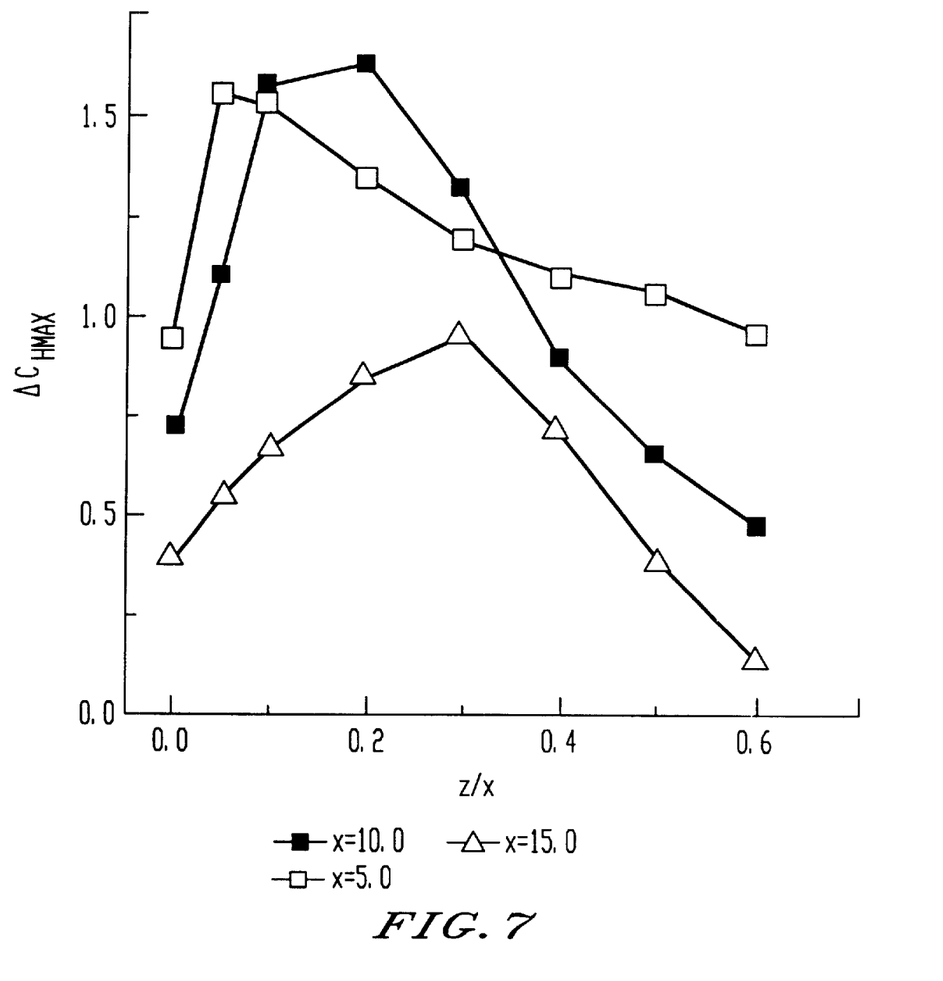
FIG. 7 shows relationships between $\Delta C_{Hmax}$ and z/x.

The flatness of the plateau region ($\Delta C_{Hmax}$) is defined as the maximum $\Delta C_H$. Table 1 shows the flatness of the plateau region between the present invention (E1–E14) and comparative examples (C1–C10). FIG. 7 plots $\Delta C_{Hmax}$ against z/x.

TABLE 1

| No. | Ti concentration x (atomic %) | Ni concentration z (atomic %) | z/x | $\Delta C_{Hmax}$ |
|---|---|---|---|---|
| Present Invention | | | | |
| E1 | 5.0 | 0.25 | 0.05 | 1.55 |
| E2 | 5.0 | 0.5 | 0.1 | 1.52 |
| E3 | 5.0 | 1.0 | 0.2 | 1.35 |
| E4 | 5.0 | 1.5 | 0.3 | 1.20 |
| E5 | 5.0 | 2.0 | 0.4 | 1.10 |
| E6 | 10.0 | 0.5 | 0.05 | 1.10 |
| E7 | 10.0 | 1.0 | 0.1 | 1.55 |
| E8 | 10.0 | 2.0 | 0.2 | 1.62 |
| E9 | 10.0 | 3.0 | 0.3 | 1.32 |
| E10 | 10.0 | 4.0 | 0.4 | 0.90 |
| E11 | 15.0 | 0.75 | 0.05 | 0.55 |
| E12 | 15.0 | 1.5 | 0.1 | 0.67 |
| E13 | 15.0 | 3.0 | 0.2 | 0.85 |
| E14 | 15.0 | 4.5 | 0.3 | 0.95 |
| Comparative Examples | | | | |
| C1 | 5.0 | 0.0 | 0.0 | 0.95 |
| C2 | 5.0 | 2.5 | 0.5 | 1.05 |
| C3 | 5.0 | 3.0 | 0.6 | 0.95 |
| C4 | 10.0 | 0.0 | 0.0 | 0.72 |
| C5 | 10.0 | 5.0 | 0.5 | 0.65 |
| C6 | 10.0 | 6.0 | 0.6 | 0.47 |
| C7 | 15.0 | 0.0 | 0.0 | 0.39 |
| C8 | 15.0 | 6.0 | 0.4 | 0.72 |
| C9 | 15.0 | 7.5 | 0.5 | 0.37 |
| C10 | 15.0 | 9.0 | 0.6 | 0.12 |

The value of z/x resulting in the flattest plateau region increases with increasing x. The plateau flatness of the alloys for z/x≧0.5 is less than that for z/x<0.5.

High Ni concentration is required when the alloys contain high concentrations of Ti. If the Ni concentration is higher than 5 atomic % (including 5%) the hydrogen discharge capacity is low, and the alloy is not good for practical use.

As a result, the appropriate Ni concentration (z) range is $0<z<(½)x$ and $z<5.0$.

Obviously, numerous modifications and variations of the present invention are possible in light of the above teachings. It is therefore to be understood that within the scope of the appended claims, the invention may be practiced in ways other than as specifically described herein.

The disclosure of the priority document, Japanese Patent Application No. 11-174385, filed Jun. 21, 1999, is incorporated by reference herein in its entirety.

What is claimed is:

1. A hydrogen storage material comprising
a vanadium-based body-centered cubic matrix phase; and
at least titanium and nickel in solid solution in the matrix phase,
wherein said material has the formula:

$$V_{100-x-y-z}Ti_xCr_yNi_z$$

where $5 \leq x \leq 15$, $5 \leq y \leq 20$, $0<z<(½)x$, and $z<5$; and
wherein a titanium concentration distribution in the matrix phase has a positive correlation with a nickel concentration distribution in the matrix phase.

2. The hydrogen storage material according to claim 1, wherein the material further comprises no more than 5 atomic % manganese.

3. A method of making a hydrogen storage material, the method comprising
melting together vanadium, titanium and nickel; and
forming the hydrogen storage material of claim 1.

4. The hydrogen storage material according to claim 1, wherein the material has the formula $V_{69}Ti_{10}Cr_{20}Ni_1$.

5. The hydrogen storage material according to claim 1, wherein the material has the formula $V_{68}Ti_{10}Cr_{20}Ni_{1.0}Mn_{1.0}$.

6. A hydrogen storage material having the formula:

$$V_{100-x-y-z}Ti_xCr_yNi_z$$

where $5 \leq x \leq 15$, $5 \leq y \leq 20$, $0<z<(½)x$, and $z<5$.

7. A method of making a hydrogen storage material, the method comprising
melting together vanadium, titanium and nickel; and
forming the hydrogen storage material of claim 6.

8. The hydrogen storage material according to claim 6, wherein the material further comprises no more than 5 atomic % manganese.

9. A hydrogen storage material having the formula:

$$V_{100-x-y-z}Ti_xCr_yNi_z$$

where $5 \leq x \leq 10$, $5 \leq y \leq 25$, $0<z<(½)x$, and $z<5$.

10. A method of making a hydrogen storage material, the method comprising
melting together vanadium, titanium and nickel; and
forming the hydrogen storage material of claim 9.

11. The hydrogen storage material according to claim 9, wherein the material further comprises no more than 5 atomic % manganese.

12. A hydrogen storage material having the formula:

$$V_{100-x-y-z}Ti_xCr_yNi_z$$

where $5 \leq x \leq 10$, $5 \leq y \leq 20$, $0<z<(½)x$, and $z<5$.

13. A method of making a hydrogen storage material, the method comprising
melting together vanadium, titanium and nickel; and
forming the hydrogen storage material of claim 12.

14. The hydrogen storage material according to claim 12, wherein the material further comprises no more than 5 atomic % manganese.

15. A hydrogen storage material having the formula:

$$V_{100-x-y-z}Ti_xCr_yNi_z$$

where $5 \leq x \leq 10$, $5 \leq y \leq 12.5$, $0<z<(½)x$, and $z<5$.

16. A method of making a hydrogen storage material, the method comprising
melting together vanadium, titanium and nickel; and
forming the hydrogen storage material of claim 15.

17. The hydrogen storage material according to claim 15, wherein the material further comprises no more than 5 atomic % manganese.

* * * * *